US011675424B2

(12) United States Patent
Robinson et al.

(10) Patent No.: US 11,675,424 B2
(45) Date of Patent: Jun. 13, 2023

(54) MIXED REALITY PRESENTATION

(71) Applicant: HEWLETT-PACKARD DEVELOPMENT COMPANY, L.P., Spring, TX (US)

(72) Inventors: Ian N. Robinson, Palo Alto, CA (US); Rafael A. Ballagas, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/424,075

(22) PCT Filed: Jan. 22, 2019

(86) PCT No.: PCT/US2019/014625
§ 371 (c)(1),
(2) Date: Jul. 19, 2021

(87) PCT Pub. No.: WO2020/153946
PCT Pub. Date: Jul. 30, 2020

(65) Prior Publication Data
US 2022/0100267 A1    Mar. 31, 2022

(51) Int. Cl.
*G06F 3/01* (2006.01)
*G06F 3/041* (2006.01)
*G06T 7/20* (2017.01)
*G06T 19/00* (2011.01)

(52) U.S. Cl.
CPC ............ *G06F 3/012* (2013.01); *G06F 3/041* (2013.01); *G06T 7/20* (2013.01); *G06T 19/006* (2013.01); *G06T 2207/10028* (2013.01)

(58) Field of Classification Search
CPC . G06F 3/012; G06F 3/041; G06T 7/20; G06T 19/006; G06T 2207/10028; G02B 2027/0138; G02B 2027/014; G02B 2027/0187; G02B 27/017
See application file for complete search history.

(56) References Cited

U.S. PATENT DOCUMENTS

| | | |
|---|---|---|
| 8,964,008 B2 | 2/2015 | Bathiche |
| 9,098,112 B2 | 8/2015 | Cheng et al. |
| 9,551,873 B2 | 1/2017 | Zalewski |
| 9,858,703 B2 | 1/2018 | Kaminitz et al. |
| 9,897,805 B2 | 2/2018 | Stafford et al. |
| 10,073,516 B2 | 9/2018 | Larsen et al. |
| 2011/0205242 A1 | 8/2011 | Friesen |

(Continued)

FOREIGN PATENT DOCUMENTS

EP    3376163 A1    9/2018

*Primary Examiner* — Chong Wu
(74) *Attorney, Agent, or Firm* — Quarles & Brady LLP

(57) ABSTRACT

A mixed reality presentation system may include a headwear to present virtual images to a person wearing the headwear and a main unit. The main unit may include sensors to sense a surrounding physical environment and position and orientation of the headwear, a virtual image generator and a transmitter. The virtual image generator is to generate the virtual images based on the sensed surrounding physical environment and the sensed headwear position and orientation. The transmitter is to transmit the generated virtual images to the headwear for presentation.

13 Claims, 6 Drawing Sheets

(56) References Cited

U.S. PATENT DOCUMENTS

| | | |
|---|---|---|
| 2013/0093788 A1 | 4/2013 | Liu |
| 2013/0127980 A1 | 5/2013 | Haddick et al. |
| 2015/0310657 A1 | 10/2015 | Eden |
| 2016/0001319 A1 | 5/2016 | Ambrus et al. |
| 2016/0260251 A1 | 9/2016 | Stafford et al. |
| 2019/0141252 A1* | 5/2019 | Pallamsetty ............ G06F 3/011 |

* cited by examiner

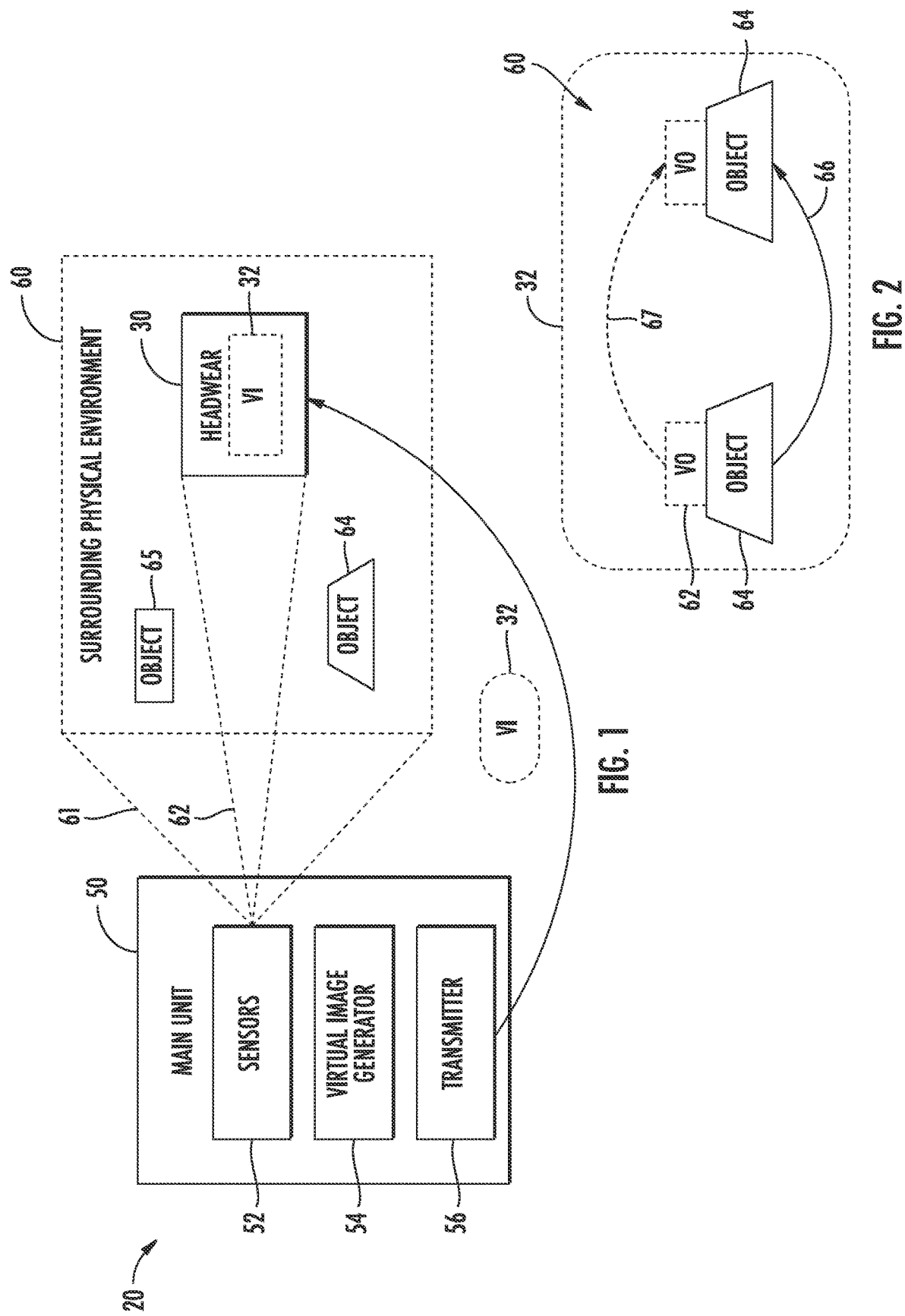

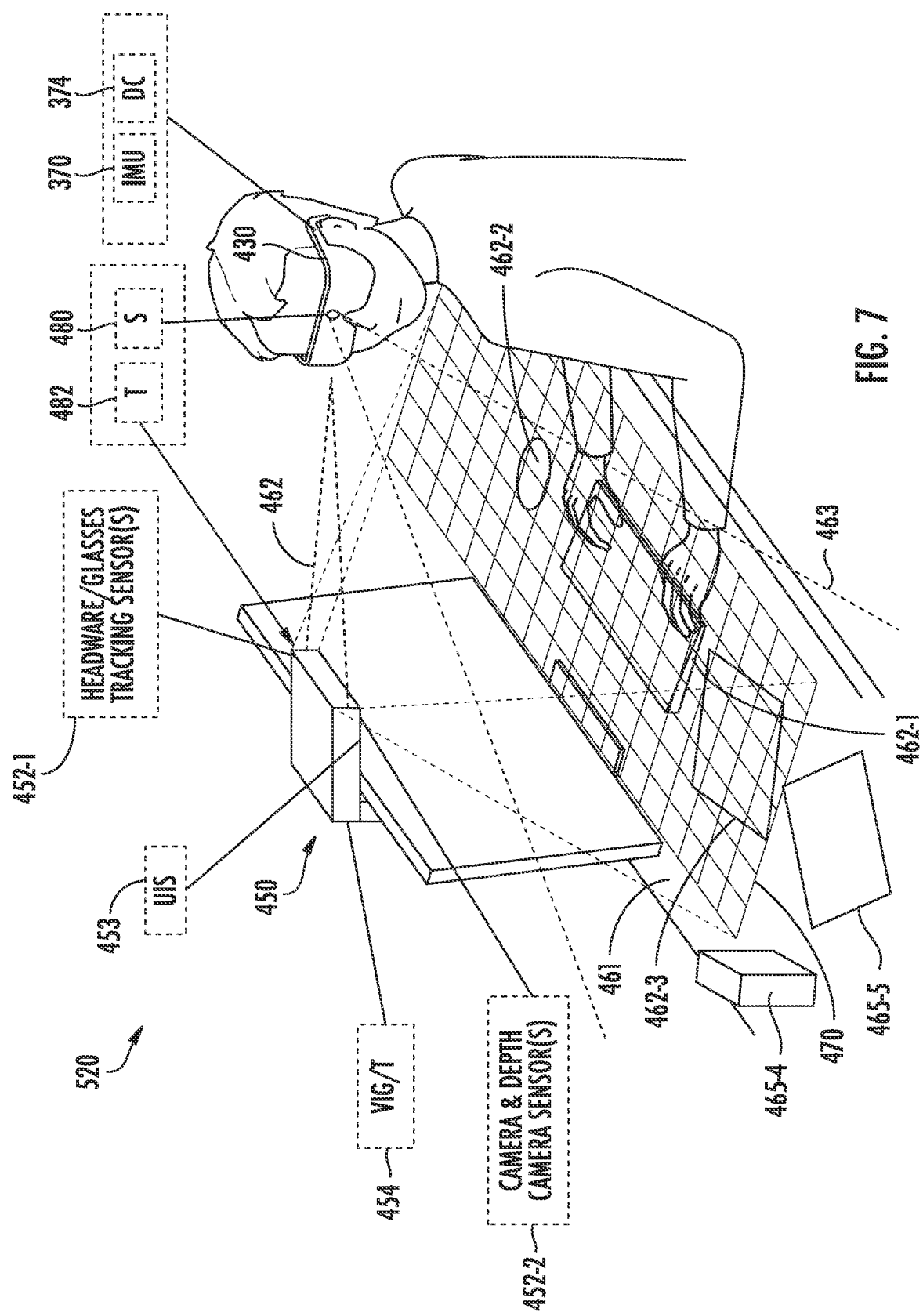

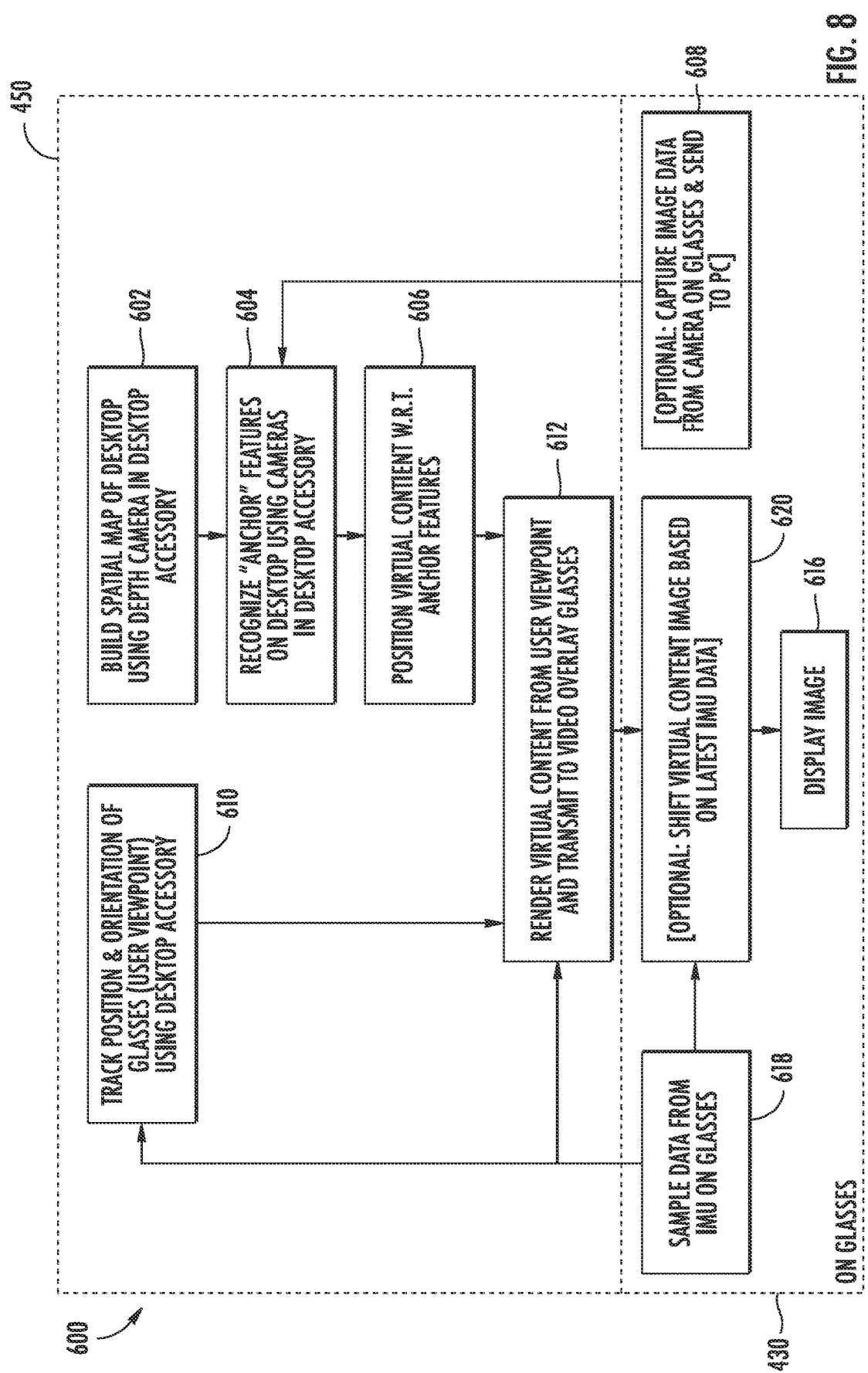

MIXED REALITY PRESENTATION

BACKGROUND

Virtual reality systems create a computer-generated simulation of a three-dimensional image or object. Augmented reality systems display virtual images or objects on top of real-world physical environments. Mixed reality systems virtually attach virtual images or objects to real-world physical objects or locations within a real-world physical environment, wherein changes to the real-world physical environment may result in changes to the virtual image being presented.

BRIEF DESCRIPTION OF THE DRAWINGS

FIG. 1 is a block diagram schematically illustrating portions of an example mixed reality presentation system.

FIG. 2 is a schematic diagram illustrating an example virtual image overlaying a real-world physical environment and the virtual attachment of a virtual object to an anchor feature or real-world object.

FIG. 7 is a perspective view of an example mixed reality presentation system.

FIG. 8 is a flow diagram of an example mixed reality presentation method.

Figure 3:
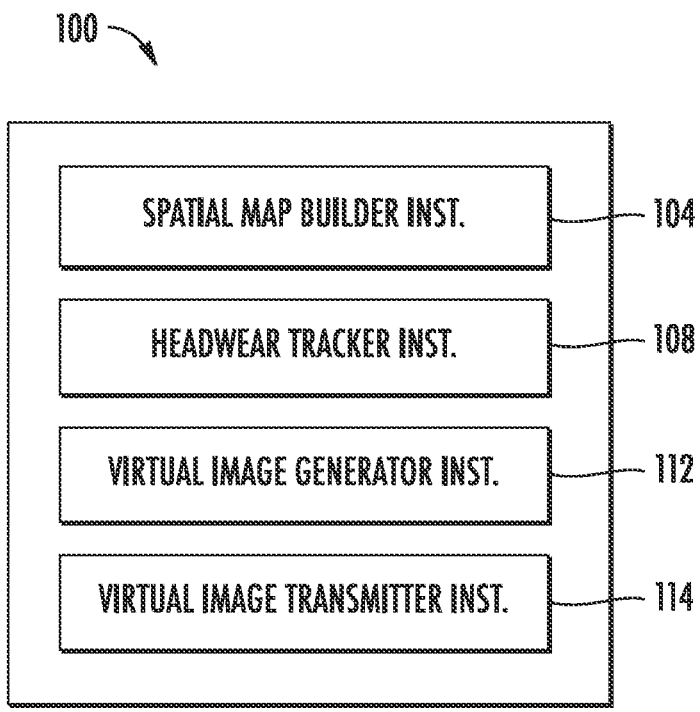
FIG. 3 is a block diagram L string portions of an example non-transitory computer-readable medium of an example virtual image generator.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are mixed reality presentation systems and mixed reality presentation methods that concentrate computing and sensing functions of the system in a main unit, facilitating the use of headwear (also referred to as headsets or glasses) that may be more compact, lighter, comfortable to wear, less costly and battery consumption efficient. The disclosed mixed reality presentation systems and mixed reality presentation methods concentrate the computing and sensing functions of the system in the main unit by employing the main unit to sense both the surrounding physical environment as well as the position and orientation of the headwear. The main unit itself carries out the generation of the virtual images based upon the sensed surrounding physical environment and the sensed hardware position and orientation. The main unit transmits the generated virtual images to the headwear for presentation by the headwear.

In some implementations, the headwear merely presents or displays the virtual images (along with any audible presentation) it receives from the main unit. The headwear, sometimes referred to as "video overlay glasses", comprise a head-worn display mechanism that optically overlays a computer-generated image (a virtual image with virtual objects) on top of the user's view through the eyewear. In some implementations, the headwear does not contain sensors for mapping the user's surroundings or for keeping overlay images "virtually attached" to real-world objects. In some implementations, the headwear does not perform any image generation itself. In some implementations, the headwear itself does not capture images or provide any image data to the main unit. In some implementations, the virtual images generated by the main unit and transmitted to the headwear omit any image data from headwear.

In some implementations, the headwear may additionally sense changes in its own position and/or orientation, wherein the headwear modifies the virtual images received from the main unit based upon its own sensed motion. In such an implementation, the headwear may not generate the virtual images, but two dimensionally shifts the virtual images it receives. In such an implementation, the headwear may include an inertial motion unit (IMU), wherein the headwear performs shifting of the virtual images received from the main unit to compensate for any headwear motion detected by the IMU in the period of time since the virtual images were generated. Such a two-dimensional shifting of the virtual images may involve much less computing componentry, computing power and battery power as compared to generating the virtual images themselves.

In some implementations, the headwear may comprise a sensor to sense the physical environment, wherein the sensed physical environment is transmitted to the main unit. In such an implementation, the main unit uses the information sensed by the headwear (in the form of signals transmitted to the main unit) to track physical objects outside the field of view of the sensors of the main unit. In some implementations, the resolution and/or depth of the sensor provided in the headwear is much lower than that of the sensors employed by the main unit to sense a surrounding physical environment. In some implementations, the signals received from sensor of the headwear are not directly used by the main unit to generate the virtual images, but are used to track physical objects outside the field of view of the main unit.

In some implementations, the main unit may further comprise a user interaction sensor. The user interaction sensor detects user touches in the surrounding physical environment. In such an implementation, the virtual images generated by the main unit and transmitted to the headwear are based upon signals from the user interaction sensor.

In some implementations, the mixed reality presentation system is in the form of a desktop environment or the method is carried out in a desktop environment. In one implementation, the mixed reality presentation system is in the form of an accessory for use with a desktop mounted or supported display and sensor system, the accessory comprising the main unit and the headwear. In one such implementation, the sensors of the main unit may be supported by a monitor, screen or display having a vertical face. In some implementations, the sensors and the virtual image generator of the main unit may be incorporated as part of the monitor, screen or display, such as with an all-in-one computing system. In some implementations, the sensors of the main unit may be supported by the monitor screen or display while the computing componentry that performs the virtual image generation based upon signals from the sensors are provided in a separate stationary computing housing or unit.

In the examples illustrated, the main unit, which is distinct from the headwear, is responsible for tracking the video overlay glasses or headwear, tracking the user's viewpoint, and creating a spatial map of the desktop and objects on its surface. The main unit further recognizes and locates a horizontal plane of the desktop surface and documents or objects on that surface. The main unit further attaches virtual content to such recognized locations such as by adding virtual object to the desktop and adds virtual content to a recognized document (such as with the commercially available HP Aurasma/Reveal). The main unit may further render the virtual content from the user's viewpoint location. In such circumstances, this may involve a final task of shifting the computer image based upon movement data from a position/orientation sensor. The resulting overlay image may then be transmitted to the video overlay glasses are headwear.

Disclosed is an example mixed reality presentation system may include a headwear to present virtual images to a person wearing the headwear and a main unit. The main unit may include sensors to sense a surrounding physical environment and position and orientation of the headwear, a virtual image generator and a transmitter. The virtual image generator is to generate the virtual images based on the sensed surrounding physical environment and the sensed headwear position and orientation. The transmitter is to transmit the generated virtual images to the headwear for presentation.

Disclosed is an example mixed reality presentation method. The method may comprise building a spatial map of a surrounding physical environment with a stationary main unit, tracking position and orientation of a headwear with the stationary main unit, generating virtual images based upon the spatial map and the tracked position and orientation of the headwear with the stationary main unit and transmitting the virtual images from the main unit to the headwear for presentation by the headwear.

Disclosed is an example mixed reality presentation system comprising a non-transitory computer-readable medium containing processor instructions. The instructions direct a processor to: build a spatial map of a surrounding physical environment with a stationary main unit; track position and orientation of a headwear with the stationary main unit; generate virtual images based upon the spatial map and the tracked position and orientation of the headwear with the stationary main unit; and transmit the virtual images from the main unit to the headwear for presentation by the headwear.

FIG. 1 is a block diagram schematically illustrating portions of an example mixed reality presentation system 20. Mixed reality presentation system 20 concentrates computing and sensing functions of the system in a main unit, facilitating the use of headwear (also referred to as headsets or glasses) that may be more compact lighter, comfortable to wear, less costly and battery consumption efficient. Mixed reality presentation system 20 concentrates the computing and sensing functions of the system in the main unit by employing the main unit to sense both the surrounding physical environment as well as the position and orientation of the headwear. The main unit itself carries out the generation of the virtual images based upon the sensed surrounding physical environment and the sensed hardware position and orientation. The main unit transmits the generated virtual images to the headwear for presentation by the headwear. Mixed reality presentation system 20 comprises headwear 30 and main unit 50.

Headwear 30 comprises an accessory to be worn by a person so as to present virtual images and, in some implementations audio, to the person wearing the headwear. Headwear 30, sometimes referred to as "video overlay glasses", comprises a head-worn display that optically overlays a computer-generated image (virtual images) on top of the user's view through the eyewear. Headwear 30 may be in the form of a headset or glasses resting above the nose and in front of the eyes of the person wearing the headwear. Headwear 30 presents virtual images 32 (shown broken lines) to the person. In the example illustrated, headwear 30 omits sensors for mapping the user's surroundings or for keeping overlay images virtually attached to real-world objects (these functions are carried out by main unit 50).

Main unit 50 carries out a majority of the computing and sensing functions of system 20. As a result, headwear 30 may be more compact, lighter, comfortable to wear, less costly and battery consumption efficient. Main unit 50 comprises sensors 52, virtual image generator 54 and transmitter 56.

Sensors 52 comprise sensors to sense a field-of-view 61 of the surrounding physical environment 60. Sensors 52 additionally sense the position and/or orientation of headwear 30 (as indicated by broken lines 62). In one implementation, sensors 52 comprise cameras and depth camera sensor(s). Sensors 52 may be stationarily supported relative to the surrounding physical environment. In other implementations, sensors 52 may be mounted on carriages, tracks or other movable actuators proximate to the surrounding physical environment 60. Sensors 52 are distinct from and not carried by headwear 30. Signals from sensor 52 are transmitted to virtual image generator 54.

Virtual image generator 54 generates virtual images based upon the sensed and mapped surrounding physical environment, the sensed position and orientation of headwear 30 and based upon instructions or programming controlling the shape, size, color, surface markings or other visual attributes and location of virtual objects to be generated with respect to the real-world or surrounding physical environment. Virtual image generator 54 transmits the virtual images to headwear 30 for presentation to the user.

As shown by FIG. 2, the virtual image 32 transmitted to headwear 30 and presented by headwear 30 may include a virtual object 62. The virtual object 62 may have some predefined relationship with a real-world physical object 64 in the surrounding physical environment 60. Virtual image generator 54 maps the location of object 64 based upon signals from sensor 52 capturing the field of view 61 of sensors 52. Based upon the mapped location of object 64 and the sensed position and/or orientation of hardware 30 (as determined from the signals from sensors 52), virtual image generator 54 generates the virtual object 62 and further virtually attaches the virtual object 62 to the associated real-world object 64.

Virtual attachment means that the relative position of the virtual object on the display of headwear 30 is based upon or defined by the mapped location and/or orientation of the associated real-world object. In such an implementation, the real-world object serves as an anchor or anchor feature for at least one virtual object or other virtual content. Although FIG. 2 illustrates the virtual object 62 as being displayed so as to be on top of or above the real-world physical object 64, it should be appreciated that such "virtual attachment" may be other relative positions of the virtual object 62 with respect to the mapped physical object 64. Such "virtual attachment" may involve a predefined spacing and/or angular offset of the virtual object 62 relative to the real-world physical object. In some implementations the "virtual attachment" may involve simulating physical interactions with the real world objects, e.g. a virtual object falling onto a physical desktop, rolling across its surface and coming to rest. In some implementations, the mapped positioning of the real-world object 64 may result in the display of the virtual object 62 being changed. For example, depending upon the mapping or real-world location of the physical object 64, the virtual object 64 may be partially shown, such as where the virtual object 64 is to be illustrated as being partially contained within, projecting from or concealed by the real-world physical object 64.

As further shown by FIG. 2, movement of the real-world object 64 within the surrounding physical environment 60 (as indicated by arrow 66) is tracked by virtual image generator 54 of main unit 50. Virtual image generator 54 alters the position (as indicated by arrow 67), shape and/or size of the displayed virtual object 62 based upon the tracked real-world relocation of object 64.

Virtual image generator 54 may comprise a processor that follows instructions provided in a non-transitory computer-readable medium. FIG. 3 is a block diagram illustrating an example non-transitory computer-readable medium 100 of main unit 50 for directing a processor of virtual image generator 54. Medium 100 may contain various instruction modules, sets of instructions or code for directing a processor to carry out its reality presentation 200 as depicted in FIG. 4.

As shown by FIG. 3, medium 100 comprises spatial map builder instructions 104, hardware tracker instructions 108, virtual image generator instructions 112 and virtual image transmitter instructions 114. Spatial map builder instructions 104 direct a processor to carry out block 208 of method 200 in FIG. 4. Spatial map builder instructions 104 direct a processor to build a spatial map of the surrounding physical environment 60. The construction of the spatial map is based upon signals from sensors 52 and physical object recognition instructions that identify the physical edges and boundaries of different physical objects within the surrounding physical environment. Instructions 104 further record the current physical location and orientation of each identified real-world physical object, such as object 64 or object 65 (shown in FIGS. 1 and 2). The mapped or tracked location of the real-world physical object may be dynamically changed as the real-world physical object 64 is relocated and/or reoriented within the surrounding physical environment 60.

Figure 4:
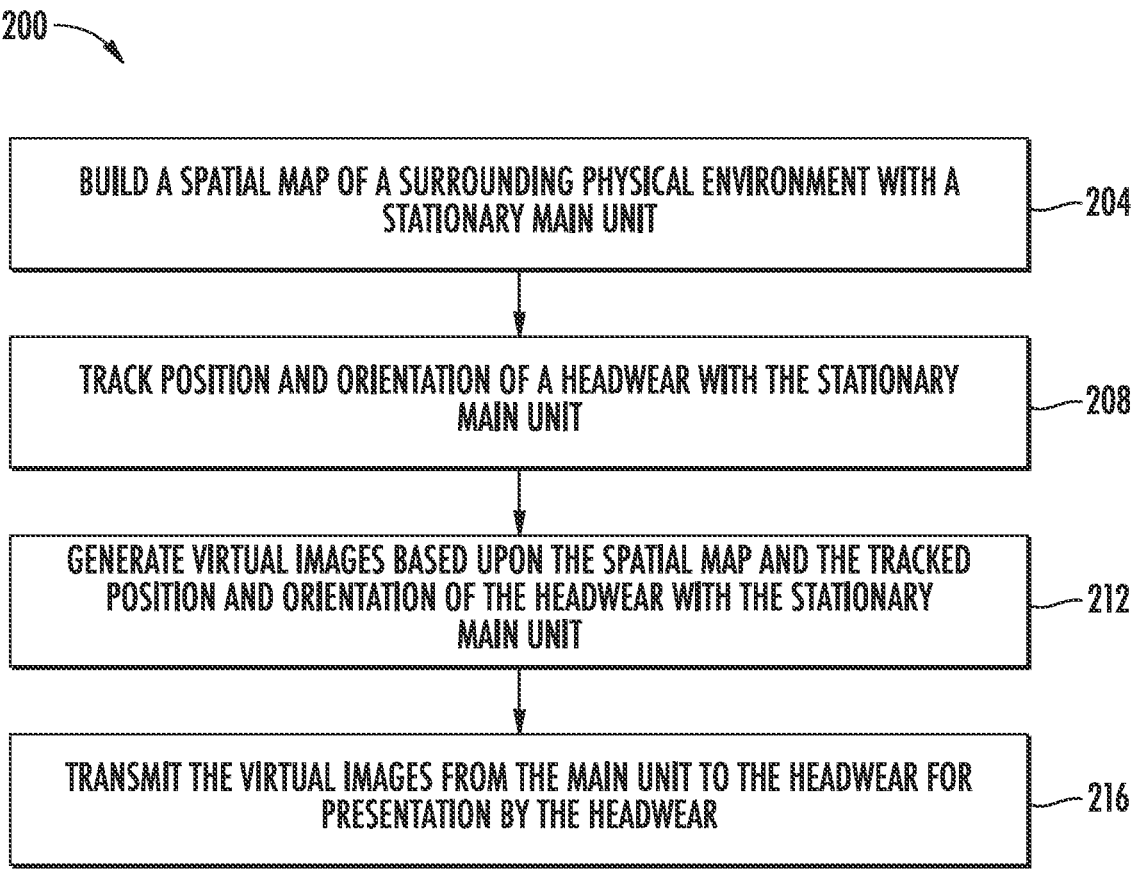
FIG. 4 is a flow diagram of an example mixed reality presentation method.

Headwear tracker instructions 108 direct a processor to carry out block 208 of method 200 shown in FIG. 4. Instructions 108 direct the processor to track position and/orientation of headwear 30. The tracked position orientation is transmitted to virtual image generator 54 (shown in FIG. 1). The position and/or orientation of the headwear 30 may impact the relative location and/or orientation of the generated virtual objects which are part of the virtual image 32 transmitted to headwear 30.

Virtual image generator instructions 112 direct the processor to carry out block 212 of method 200 shown in FIG. 4. Instructions 112 direct the processor to generate virtual images, containing a virtual object, or multiple virtual objects for presentation by headwear 30. A virtual object may be a three-dimensional object, a two-dimensional object, text, graphics or other virtual constructions. The virtual objects forming the virtual image may have processor generated or computer-generated sizes, shapes and locations that are based upon the spatial map of the surrounding physical environment 60 and its real-world physical objects 64, 65 (or other real-world physical objects) as well as the position and/or orientation of the headwear 30, which indicates the viewpoint of the person wearing headwear 30. The virtual objects are also, primarily, based on the nature of the mixed reality application responsible for generating them, e.g. explanatory text in a training app or a 3D model in a CAD app. As virtual objects are moved or reoriented within the surrounding physical environment and/or as headwear 30 is reoriented or redirected by the person wearing headwear 30, virtual image generator 54, following virtual image generator instructions 112, may alter the size, shape and size or location of the computer-generated virtual objects or other portions of the virtual image 32. The sensors 52 may also detect user interactions with the virtual objects, which the virtual image generator instructions 112 may use to cause the object to respond in some visual or audible way according to the nature of the application.

Virtual image transmitter instructions 104 direct the processor to carry out block 216 of method 200 of FIG. 4. Instructions 104 direct the processor to output control signals to the transmitter 56 causing the transmitter 56 to transmit, in a wired or wireless fashion, the virtual images to headwear 34 presentation by headwear 30. In one implementation, transmitter 56 may comprise a Bluetooth transmitter. In other implementations, transmitter 56 may comprise other forms of wireless or wired transmitters. Because the virtual images are created by virtual image generator 54 of main unit 50 and transmitted to headwear 30, rather than headwear 30 generating the images, headwear 30 simply presents such virtual images, allowing headwear 30 to be less cumbersome, lighter in weight and less costly.

Figure 5:
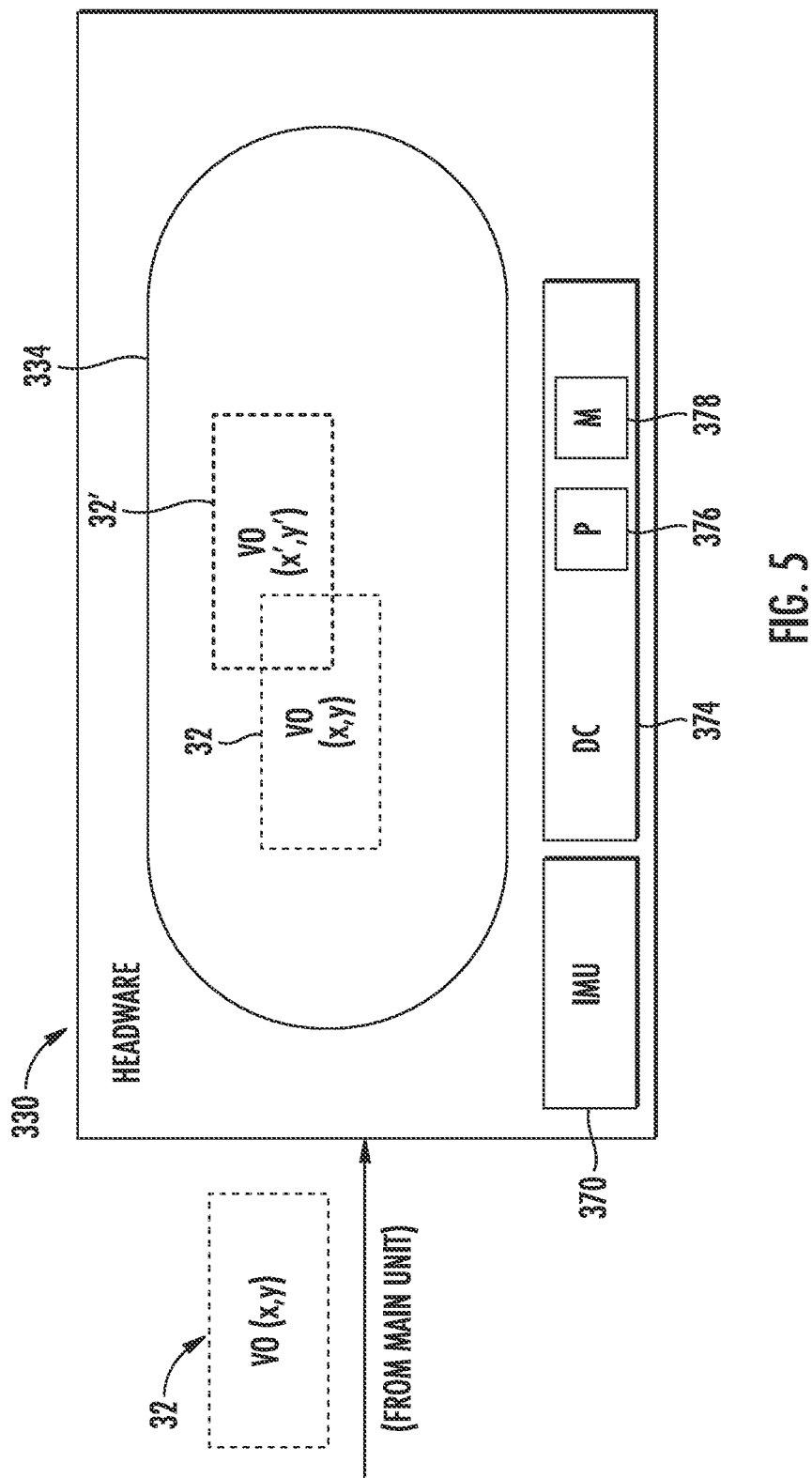
FIG. 5 is a block diagram schematically will string portions of an example headwear.

FIG. 5 is a block diagram schematically illustrating headwear 330. Headwear 330 may be employed as part of system 20 described above and may be utilized as part of method 200. Headwear 330 utilizes virtual images that are generated by main unit 50, allowing headwear 330 to be less complex, lighter, less cumbersome and less expensive. In the example illustrated, headwear 330 senses changes in its own position and/or orientation (i.e., movement) and utilizes a sensed position and/or orientation change to adjust, not generate, the virtual images received from main unit 50 prior to their presentation to the person wearing headwear 330. Headwear 330 comprises inertial motion unit 370 and display controller 374.

Inertial motion unit 370 comprises a sensor that senses changes in the position and/or orientation of headwear 330 which correlates to the position and orientation of the field-of-view provided by headwear 330 to the person wearing headwear 330. In one implementation, inertial motion unit 370 comprises an accelerometer or multiple accelerometers. In one implementation, inertial motion sensor 370 comprises a gyroscope. In other implementations, inertial motion unit 370 both accelerometers and a gyroscope. In other implementations, inertial motion unit 370 may comprise other forms of sensors to sense the position and/orientation of headwear 330. Inertial motion unit 370 outputs signals indicating the sensed changes in position and/or orientation to display controller 374.

Display controller 374 controls the display of the virtual image 32 received from main unit 50 on the display portion 334 of headwear 330. Display controller 374 comprises processor 376 and non-transfer computer-readable medium 378. Processor 376 carries out instructions contained in provided on medium 378. Medium 370 comprises a computer-readable medium containing instructions, such as in the form of programming or code, that direct the processor 376 to output signals adjusting the display of virtual image 32 based upon signals from inertial motion unit 370.

In the example shown in FIG. 5, headwear 330 is illustrated as receiving the virtual image 32 having a virtual object located at coordinates x,y of the display presentation of headwear 330. Based upon signals from inertial motion unit 370, processor 376, following instructions contained in memory 378, two dimensionally shifts the virtual object of virtual image 32 to new coordinates x', y' such that the virtual image 32 is shifted and presented as virtual image 32' on the display portion 334 of headwear 330. Such a two-dimensional shift may improve the accuracy of a mixed reality presentation by correcting for errors in the virtual image 32 caused by time delays from when sensors 52 sensed the position and orientation of headwear 332 and the time that headwear 330 receives the virtual images that were based upon the original sensed position of headwear 330 by main unit 50. For example, by the time that headwear 330 receives a virtual image 32, the person wearing headwear 330 may have moved or reoriented his or her view as well as headwear 330. By shifting the received virtual image based upon the more current headwear position and/or orientation, as sensed by inertial motion unit 370, headwear 330 provides a more accurate mixed reality presentation.

In the example illustrated, display controller 374 relocates or shifts virtual image 32, but does not generate virtual image 32 or its virtual objects. An accurate correction in the virtual image based on the detected motion of the headwear would use a full 3D transform of the virtual image contents. However three factors result in a 2D shift operation being an acceptable first approximation. Firstly, the user's head motion is typically small compared to the frame rates (typically 60 Hz or more) and latencies of the hardware. Secondly, the user's head motions are primarily rotations about the neck. Thirdly, the bulk of the virtual content rendered is within a limited range of distances from the user (e.g. corresponding to the desktop). Thus, to a first approximation, the virtual imagery may be treated as being on the inside surface of a sphere centered on the user's head and with a radius corresponding to the distance from the user's head to the desktop The main unit 50 may also transmit parameters to the display controller 374 that are used to control the 2D correction based, for example, on the main unit's determination of the headwear's distance from the desktop. As a result, headwear 330 may more accurately display the virtual image with respect to the physical real-world objects without incurring the cost, weight and size associated with generation of the virtual image itself by headwear 330.

Figure 6:
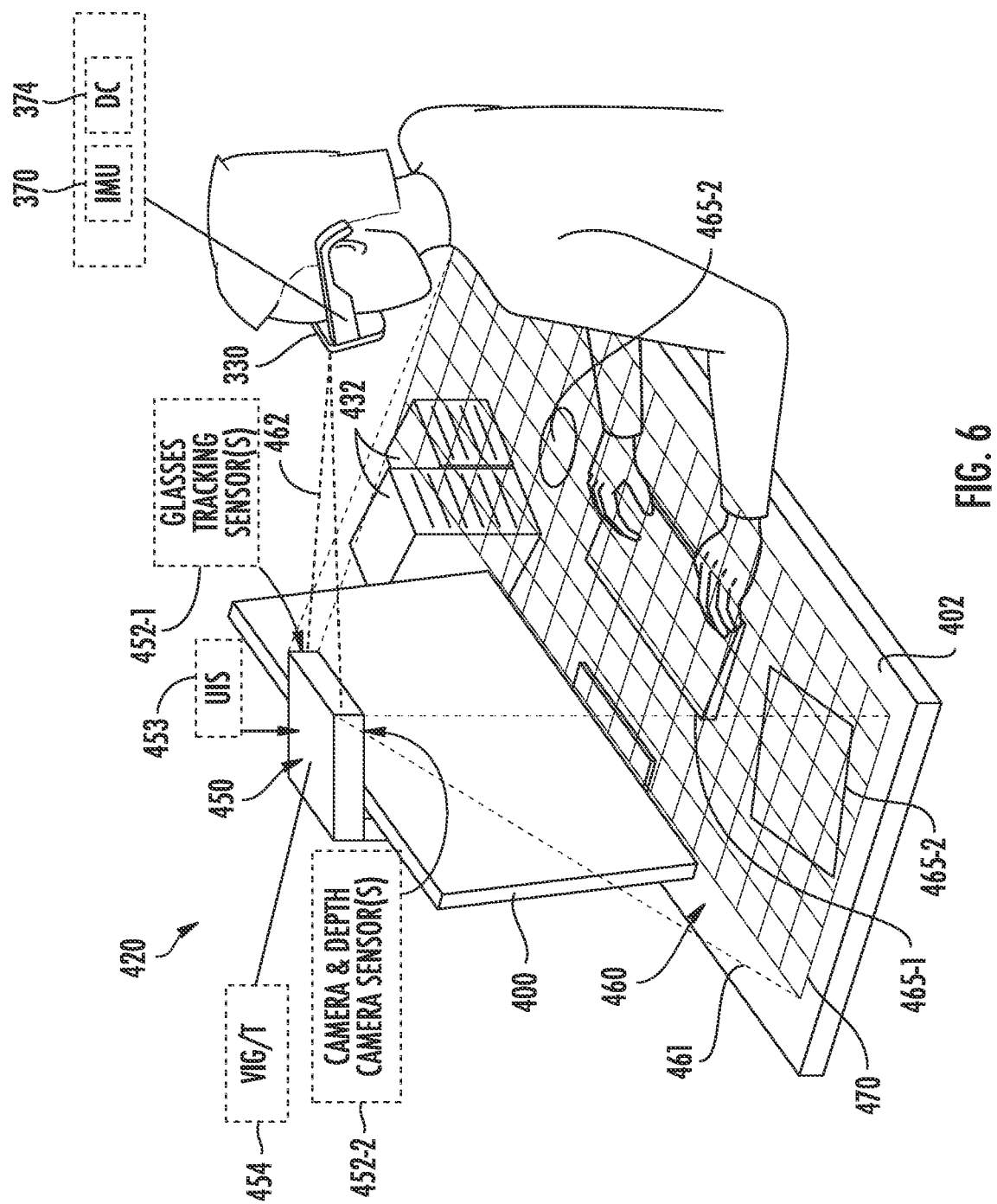
FIG. 6 is a perspective view of an example mixed reality presentation system.

FIG. 6 is a perspective view illustrating portions of an example mixed reality presentation system 420 employed as part of a mixed reality desktop system. System 420 provides a simulated desktop environment that includes a mixture of both real-world physical objects and virtual objects. In some implementations, the virtual objects may be virtually attached to particular real-world physical objects as described above. In the example illustrated, for some 20 is provided as part of an accessory for use with a desktop computing system having a monitor, screen or display 408 flat desktop surface 402. System 420 comprises headwear 330 (described above) and main unit 450.

Main unit 450 is supported by display 400 in a single box housing which also contains headwear/glasses tracking sensor(s) 452-1, camera and depth camera sensor(s) 452-2, user interaction sensor 453 and virtual image generator/transmitter 454. Tracking sensors 452-1 comprise infrared sensors, camera optionally including depth sensors, or other sensors that sense the position and/or orientation of headwear 330 (as indicated by broken lines 462). In one implementation, sensors 452-1 comprise optical tracking sensors which locate headwear 330 in a working volume corresponding to a desk worker's range of head positions. In one implementation, sensors may track one or more features, such as infrared lights or pattern markings on headwear 430.

Sensors 452-2 sense or capture images of desktop surface 402 and those real-world objects within the field of view 461 of such cameras and depth cameras. In the example illustrated, sensors 452-1 and 452-2 are provided as part of a head that is cantilevered above and projects forward of display 400 to capture a field-of-view 461 that encompasses the working area of surface 402 between the person wearing headwear 330 and display 400. The working area on top of surface 402 may include real-world physical objects such as a keyboard, keypad or tablet computer 465-1, a computer mouse 465-2 and a real-world physical document, a paper pad, book or sheet of paper 465-3. The real-world physical objects may also include the user's hands, forearms etc. Each of such real-world physical objects (collectively referred to as objects 465) are captured as part of images by sensors 452-2.

User interaction sensor 453 detects user touches in the surrounding physical environment 460. This may be used to supplement the system's detection of the user's hand gestures using sensors 452-2. In such an implementation, the virtual images generated by the main unit and transmitted to the headwear are based upon signals from the user interaction sensor. In one implementation, user interaction sensor 453 may comprise a microphone coupled to the desktop, or an infrared laser projected as a plane over the desktop with an associated detector.

Virtual image generator/transmitter 454 corresponds to and is generally the same as virtual image generator 54 and transmitter 56 as described above. Virtual image generator/transmitter 454 may include medium 100 and may carry out method 200. As described above, virtual image generator/transmitter 454, using signals from cameras or sensors 452-2 generates a map 470 (shown as a grid) of the surrounding physical environment 460 including the physical real-world objects 465 on surface 402. Virtual image generator/transmitter 454 employs object recognition to identify and define distinct real-world objects based upon edge, feature and contour identification. Characteristics of the identified real-world objects, such as their location and orientation relative to other real-world objects and in the general space of environment 460 is dynamically determined in real time and stored. Virtual Image generator/transmitter 454 tracks the movement and orientations of such identify distinct physical real-world objects.

As described above, virtual image generator/transmitter 454 further tracks the position and/or orientation of headwear 330 using signals from sensors 452-1. Virtual image generator/transmitter 454 determines the current field-of-view being provided by headwear 330 from those signals received from sensors 452-1. Using the determined field-of-view, virtual image generator/transmitter 454 determines what portion of the mapped real-world physical environment 460 is within the field-of-view. By identifying what real-world physical objects are presently within the field-of-view of headwear 330, virtual image generator/transmitter 454 determines not only what virtual objects will also be within the same field-of-view, but the size, shape, location and/or orientation of such virtual objects given the particular field-of-view provided by headwear 330 in the mapped location of objects 465. Movement of a real-world physical object, as seen in the field-of-view from headwear 330, may result in changes to characteristics of a virtual object or multiple virtual objects (example virtual objects 432 being shown in FIG. 6) provided as part of the virtual image transmitted headwear 330. For example, movement of a real-world physical object may result in a change to map 470 which may then also result in a change in the position, orientation, size or portion depicted (such as when the virtual object would be being blocked, concealed or at least partially received by a real-world object).

In some implementations, any of the above described real-world physical objects 465 may alternatively be in the form of virtual objects. For example, the keyboard or touchpad 465-1 may be a virtual object. The document, tablet or sheet of paper 465-3 may be a virtual object. The computer mouse 465-2 may be a virtual object. In such implementations, user interaction sensor 453 may sense interactions or manipulations with such virtual objects by the person hands or articles carried by the person's hands. For example, the user may manipulate a stylus (or virtual sylus) relative to virtual object 456-3. Based upon such sensed interaction, a virtual object, text, may be displayed on top of the virtual object 465-3, wherein the "written upon" virtual document is then stored in a memory of system 420.

As described above, the sensing and computational operations of system 420 are concentrated in main unit 450 rather than headwear 330. In the example illustrated, the sensors in the virtual image generator are both illustrated as being part of an accessory contained within a single housing. In other implementations, sensors 452-1 and 452-2 may be separate and distinct from virtual image generator/transmitter 454. For example, image generator/transmitter 454 may be software running on a personal computer to which sensors 452 are attached as an accessory. Sensors 452-1 and 452-2 as well as virtual image generator/transmitter 454 may provide in various forms in various locations apart from headwear 330.

FIG. 7 is a perspective view illustrating portions of an example mixed reality presentation system 520. Mixed reality presentation system 520 is similar to mixed reality presentation system 420 described above except that system 520 comprises headwear 430 in place of headwear 330 and that virtual image generator/transmitter 454 followed instructions that additionally utilize information provided by headwear 430. Those remaining components of system 520 which correspond to components of system 420 are numbered similarly. In the example illustrated, the prior real-world physical objects 465-1, 465-2 and 465-3 are instead replaced by corresponding, and similarly functioning virtual objects 462-1 (a virtual keyboard or tablet), 462-2 (a virtual computer mouse) and 462-3 (a virtual document, book, sheet of paper or the like).

Headwear 430 is similar to headwear 330 except that headwear 430 additionally comprises sensor 480 and transmitter 482. Sensor 480 comprise a sensor, such as a camera or other sensing device, that senses the physical environment, such as the physical environment outside the field-of-view of sensors 452-1. As shown by FIG. 7, because sensor 480 is carried by headwear 430, its field-of-view may be adjusted by the user simply revising his or her field-of-view. As a result, sensor 480 may capture real-world physical objects 465-4, 465-5 in the field-of-view 463 of sensor 480 that extends beyond the field-of-view 461 of sensors 452-1. Such images of real-world objects 465-4 and 465-5 may be transmitted by transmitter 482 to virtual image generator and transmitter 454. In some implementations, transmitter 482 may also serve as a receiver (in the form of a transceiver) that also receives the virtual images generated by main unit 450.

In one implementation, the main unit 450 uses the information sensed by sensor 480 of headwear 430 (in the form of signals transmitted to the main unit 450) to track physical objects outside the field of view 461 of the sensors 452-2 of the main unit 450. In some implementations, the resolution and/or depth sensing capabilities of the sensor 480 provided in the headwear 430 is much lower than that of the sensors employed by the main unit to sense a surrounding physical environment, wherein the image resolution is sufficient for identifying, distinguishing and tracking real-world objects when they leave the field-of-view 461. In some implementations, the images provided by sensor 480 may provide virtual image generator/transmitter 454 with a second viewpoint capturing surfaces facing the user that that are not visible to the sensors 452-2. In some implementations, the signals received from sensor 480 of the headwear 430 are not directly used by the main unit 450 to generate the virtual images, but are merely are largely used to track physical objects outside the field of view of the main unit 450.

FIG. 8 is a flow diagram of an example mixed reality presentation method 600 comprising the actions taken by headwear 430 (contained in the broken line box) as compared to actions taken by main unit 450 of system 520. As indicated by block 602, virtual image generator/transmitter 454 builds a spatial map of the desktop using depth camera 452-2 in the desktop accessory or head of main unit 450. The spatial map may be a 3D computer representation of the desktop and objects on it.

As indicated by block 604, virtual image generator/transmitter 454 further recognizes "anchor" features on the desktop using the cameras 452-2. Such recognition may involve the location of the horizontal plane of the desktop surface as well as the identification of different documents and objects on the desktop surface. As indicated by block 608, and some implementations, that is where headwear 430 is used, images captured from headwear 430 may be received by main unit 450, wherein the images are used to track or recognize features or objects on the desktop that may be otherwise outside the field-of-view of cameras 452-2. As indicated by block 606, virtual image generator/transmitter 454 further positions virtual content with respect to such anchor features. In other words, virtual image generator session emitter 454 attaches virtual content, such as virtual objects, to such anchor features or real-world physical objects as described above.

As indicated by block 610, virtual image generator/transmitter 454 further tracks the position and/or orientation of the glasses/headwear 430 (the user viewpoint) based upon signals from sensors 452-1. As indicated by block 612, virtual image generator/transmitter 454 renders virtual content from the user viewpoint and transmits the virtual images to the headwear 430 (also referred to as video overlay glasses). The virtual content or virtual objects are positioned and/or oriented based upon any virtual attachments with respect to anchor features or real-world physical objects.

As indicated by block 616, the display controller 374 of the headwear 430 displays the virtual image received from the main unit 450. As indicated by block 618, and some modes of operation, the inertial motion unit 370 may sample data regarding the motion of headwear 430. As indicated by block 620, in such an optional implementation or mode of operation, the display controller 374 may additionally shift the virtual image or its virtual content based upon the latest, possibly more current, changes in the headwear position and orientation as detected by the inertial motion unit 370.

Although the present disclosure has been described with reference to example implementations, workers skilled in the art will recognize that changes may be made in form and detail without departing from the scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A mixed reality presentation system comprising:
   a headwear to present virtual images to a person wearing the headwear;
   a main unit comprising:
      sensors to sense a surrounding physical environment and position and orientation of the headwear;
      a virtual image generator to generate the virtual images based on the sensed surrounding physical environment and the sensed position and orientation of the headwear; and
      a transmitter to transmit the generated virtual images to the headwear for presentation;
      wherein the main unit is a stationary desktop accessory in a single box housing, and
      wherein the headwear includes an inertial motion sensor and a display controller to modify the virtual images received from the main unit based on signals from the inertial motion sensor.

2. The system of claim 1, wherein the display controller is configured to modify the virtual images by performing a two-dimension shift of the virtual images.

3. The system of claim 1, wherein the sensors of the main unit has a field of view and wherein the headwear further comprises a sensor to sense the physical environment outside the field of view and transmit signals to the main unit for use by the main unit to track physical objects outside the field of view.

4. The system of claim 1, wherein the sensors of the main unit are supported by a display having a vertical face.

5. The system of claim 1, wherein the virtual image generator is to virtually attach the generated virtual images to objects of the sensed surrounding physical environment such that the generated virtual images attached to the object are positionally relocated based upon sensed movement of the object.

6. The system of claim 1, wherein the sensors of the main unit comprise:
   optical tracking sensors to locate and track movement of the headwear; and
   image and depth cameras to sense the surrounding physical environment.

7. The system of claim 6, wherein the sensors of the main unit further comprise a user interaction sensor to detect user touches in the surrounding physical environment.

8. The system of claim 1, wherein the main unit is part of a stationary desktop mounted display and sensor system.

9. A mixed reality presentation method comprising:
   building a spatial map of a surrounding physical environment with a stationary main unit;
   tracking position and orientation of a headwear with the stationary main unit;
   generating virtual images based upon the spatial map and the tracked position and orientation of the headwear with the stationary main unit;
   transmitting the virtual images from the stationary main unit to the headwear for presentation by the headwear, wherein the stationary main unit is a stationary desktop accessory in a single box housing;
   sensing, with an inertial motion sensor of the headwear, movement of the headwear; and
   modifying, with a display controller of the headwear, the virtual images received from the stationary main unit based upon signals from the inertial motion sensor.

10. The method of claim 9, wherein the stationary main unit is a desktop accessory and wherein the surrounding physical environment comprises a desktop.

11. The method of claim 9, wherein the virtual images generated by the stationary main unit and transmitted to the headwear omit any image data from the headwear.

12. A mixed reality presentation system comprising a non-transitory computer-readable medium containing instructions to direct a processor to:
   build a spatial map of a surrounding physical environment with a stationary main unit;
   track position and orientation of a headwear with the stationary main unit;
   generate virtual images based upon the spatial map and the tracked position and orientation of the headwear with the stationary main unit;
   transmit the virtual images from the stationary main unit to the headwear for presentation by the headwear;
   sense movement of the headwear with an inertial motion sensor included in the headwear; and
   modifying, with a display controller of the headwear, the virtual images received from the stationary main unit based upon signals from the inertial motion sensor,
   wherein the stationary main unit is a stationary desktop accessory in a single box housing.

13. The mixed reality presentation system of claim 12, wherein the stationary desktop accessory includes the non-transitory computer-readable medium.

* * * * *